US009898251B2

(12) United States Patent
Dupont De Dinechin et al.

(10) Patent No.: US 9,898,251 B2
(45) Date of Patent: Feb. 20, 2018

(54) BIT-MATRIX MULTIPLICATION USING EXPLICIT REGISTER

(71) Applicant: KALRAY, Orsay (FR)

(72) Inventors: Benoît Dupont De Dinechin, Grenoble (FR); Marta Rybczynska, Grenoble (FR)

(73) Assignee: KALRAY, Orsay (FR)

( * ) Notice: Subject to any disclaimer, the term of this patent is extended or adjusted under 35 U.S.C. 154(b) by 210 days.

(21) Appl. No.: 14/716,234

(22) Filed: May 19, 2015

(65) Prior Publication Data

US 2015/0339101 A1 Nov. 26, 2015

(30) Foreign Application Priority Data

May 23, 2014 (FR) .................................. 14 54683

(51) Int. Cl.
| | | |
|---|---|---|
| G06F 7/78 | (2006.01) | |
| G06F 7/76 | (2006.01) | |
| G06F 17/16 | (2006.01) | |
| G06F 7/523 | (2006.01) | |
| G06F 9/30 | (2018.01) | |

(52) U.S. Cl.
CPC ............... *G06F 7/523* (2013.01); *G06F 7/76* (2013.01); *G06F 7/78* (2013.01); *G06F 9/3001* (2013.01); *G06F 9/30036* (2013.01); *G06F 17/16* (2013.01)

(58) Field of Classification Search
CPC ...... G06F 7/76; G06F 9/3001; G06F 9/30032; G06F 17/16
See application file for complete search history.

(56) References Cited

U.S. PATENT DOCUMENTS

| | | | |
|---|---|---|---|
| 2002/0010847 A1 | 1/2002 | Abdallah et al. | |
| 2002/0116602 A1* | 8/2002 | Kissell | G06F 9/30032 712/223 |
| 2004/0255100 A1 | 12/2004 | Kershaw | |
| 2010/0318591 A1* | 12/2010 | Long | G06F 7/02 708/212 |
| 2014/0344515 A1* | 11/2014 | Wang | G06F 12/02 711/110 |
| 2016/0179523 A1* | 6/2016 | Ould-Ahmed-Vall | G06F 9/30029 712/221 |

FOREIGN PATENT DOCUMENTS

WO 0068783 A2 11/2000

OTHER PUBLICATIONS

ECE4530 Fall 2011: Codesign Challenge Bit-Matrix Multiplication on a DE2-115 FPGA Board, 2011, pp. 1-7.*
Hilezitz et al. "Bit Matrix Multiplication in Commodity Processors". IEEE, 2008, pp. 7-12.*
Amstel, "Efficient and scalable bit-matrix multiplicationin bit-slice format", 2012. 6 pages.*

* cited by examiner

*Primary Examiner* — Chuong D Ngo
(74) *Attorney, Agent, or Firm* — Oliff PLC

(57) ABSTRACT

The invention relates to a processor comprising, in its instruction set, a bit matrix multiplication instruction (sbmm) having a first double precision operand (A) representing a first matrix to multiply, a second operand (B) explicitly designating any two single precision registers whose joint contents represent a second matrix to multiply, and a destination parameter (C) explicitly designating any two single precision registers for jointly containing a matrix representing the result of the multiplication.

7 Claims, 3 Drawing Sheets

| r0 | 07 | 06 | 05 | 04 | 03 | 02 | 01 | 00 |
|---|---|---|---|---|---|---|---|---|
|  | 17 | 16 | 15 | 14 | 13 | 12 | 11 | 10 |
|  | 27 | 26 | 25 | 24 | 23 | 22 | 21 | 20 |
|  | 37 | 36 | 35 | 34 | 33 | 32 | 31 | 30 |
| r1 | 47 | 46 | 45 | 44 | 43 | 42 | 41 | 40 |
|  | 57 | 56 | 55 | 54 | 53 | 52 | 51 | 50 |
|  | 67 | 66 | 65 | 64 | 63 | 62 | 61 | 60 |
|  | 77 | 76 | 75 | 74 | 73 | 72 | 71 | 70 |

WA

| r2 | 07 | 06 | 05 | 04 | 03 | 02 | 01 | 00 |
|---|---|---|---|---|---|---|---|---|
|  | 17 | 16 | 15 | 14 | 13 | 12 | 11 | 10 |
|  | 27 | 26 | 25 | 24 | 23 | 22 | 21 | 20 |
|  | 37 | 36 | 35 | 34 | 33 | 32 | 31 | 30 |
| r3 | 47 | 46 | 45 | 44 | 43 | 42 | 41 | 40 |
|  | 57 | 56 | 55 | 54 | 53 | 52 | 51 | 50 |
|  | 67 | 66 | 65 | 64 | 63 | 62 | 61 | 60 |
|  | 77 | 76 | 75 | 74 | 73 | 72 | 71 | 70 |

WB

| r0 | 07 | 06 | 05 | 04 | 03 | 02 | 01 | 00 | MID |
|---|---|---|---|---|---|---|---|---|---|
|  | 17 | 16 | 15 | 14 | 13 | 12 | 11 | 10 |  |
|  | 27 | 26 | 25 | 24 | 23 | 22 | 21 | 20 |  |
|  | 37 | 36 | 35 | 34 | 33 | 32 | 31 | 30 |  |
| r2 | *07* | *06* | *05* | *04* | *03* | *02* | *01* | *00* |  |
|  | *17* | *16* | *15* | *14* | *13* | *12* | *11* | *10* |  |
|  | *27* | *26* | *25* | *24* | *23* | *22* | *21* | *20* |  |
|  | *37* | *36* | *35* | *34* | *33* | *32* | *31* | *30* |  |

| r1 | 47 | 46 | 45 | 44 | 43 | 42 | 41 | 40 | 01 |
|---|---|---|---|---|---|---|---|---|---|
|  | 57 | 56 | 55 | 54 | 53 | 52 | 51 | 50 | 02 |
|  | 67 | 66 | 65 | 64 | 63 | 62 | 61 | 60 | 04 |
|  | 77 | 76 | 75 | 74 | 73 | 72 | 71 | 70 | 08 |
| r3 | 47 | 46 | 45 | 44 | 43 | 42 | 41 | 40 | 10 |
|  | 57 | 56 | 55 | 54 | 53 | 52 | 51 | 50 | 20 |
|  | 67 | 66 | 65 | 64 | 63 | 62 | 61 | 60 | 40 |
|  | 77 | 76 | 75 | 74 | 73 | 72 | 71 | 70 | 80 |

| r10 | 07 | 06 | 05 | 04 | 03 | 02 | 01 | 00 | MOP |
|---|---|---|---|---|---|---|---|---|---|
|  | 17 | 16 | 15 | 14 | 13 | 12 | 11 | 10 |  |
|  | *07* | *06* | *05* | *04* | *03* | *02* | *01* | *00* |  |
|  | *17* | *16* | *15* | *14* | *13* | *12* | *11* | *10* |  |
| r11 | 27 | 26 | 25 | 24 | 23 | 22 | 21 | 20 |  |
|  | 37 | 36 | 35 | 34 | 33 | 32 | 31 | 30 |  |
|  | *27* | *26* | *25* | *24* | *23* | *22* | *21* | *20* |  |
|  | *37* | *36* | *35* | *34* | *33* | *32* | *31* | *30* |  |

| r12 | 47 | 46 | 45 | 44 | 43 | 42 | 41 | 40 | 01 |
|---|---|---|---|---|---|---|---|---|---|
|  | 57 | 56 | 55 | 54 | 53 | 52 | 51 | 50 | 02 |
|  | 47 | 46 | 45 | 44 | 43 | 42 | 41 | 40 | 10 |
|  | 57 | 56 | 55 | 54 | 53 | 52 | 51 | 50 | 20 |
| r13 | 67 | 66 | 65 | 64 | 63 | 62 | 61 | 60 | 04 |
|  | 77 | 76 | 75 | 74 | 73 | 72 | 71 | 70 | 08 |
|  | 67 | 66 | 65 | 64 | 63 | 62 | 61 | 60 | 40 |
|  | 77 | 76 | 75 | 74 | 73 | 72 | 71 | 70 | 80 |

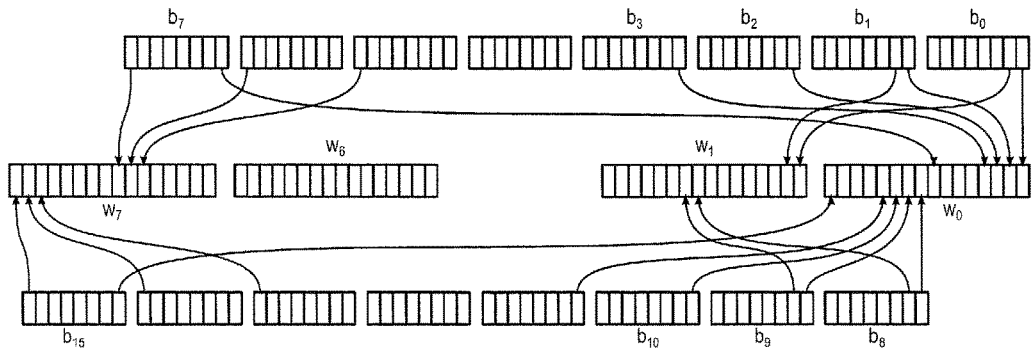

BIT-MATRIX MULTIPLICATION USING EXPLICIT REGISTER

FIELD

The invention relates to a processor having data reorganization functionality, in particular using a bit matrix multiplication unit.

BACKGROUND

A bit matrix multiplication unit (BMM) allows a reorganization of data in a single instruction cycle. Many types of reorganization are possible, up to a reorganization of the individual bits of the processed data. The article [Yedidya Hilewitz et al. "Bit Matrix Multiplication in Commodity Processors", IEEE International Conference on Application-Specific Systems, Architectures and Processors, 2008] describes applications of BMM units.

In practice, a BMM operator is used with one of its operands at a constant value selected to define a particular operation on the contents of the other operand. Constants chosen for the first operand may define permutations of the rows of the matrix assigned to the second operand, i.e. permutations of words represented by the rows. Constants chosen for the second operand may define permutations of the columns of the matrix assigned to the first operand, i.e. permutations of bits according to a same pattern applied to all the rows of the matrix.

However, a BMM unit finds limits in terms of efficiency when the reorganizations mix data from multiple matrices.

SUMMARY

A processor is generally provided, comprising, in its instruction set, a bit matrix multiplication instruction having a first double precision operand representing a first matrix to multiply, a second operand explicitly designating any two single precision registers whose joint contents represent a second matrix to multiply, and a destination parameter explicitly designating any two single precision registers for jointly containing a matrix representing the result of the multiplication.

The processor may comprise a register file of single precision registers configured for, upon reading, joining the contents of two individually selected registers in an output word of double precision, and, upon writing, splitting an input double precision word into two individually selected registers; a bit matrix multiplication unit configured for receiving two multiplicand matrices in the form of double precision words and writing a result matrix in the form of a double precision word in the register file; an instruction processing unit configured for, upon execution of a bit matrix multiplication instruction:
  providing the first operand directly as a first of the two multiplicands of the bit matrix multiplication unit,
  using the second operand to read in the register file the second multiplicand of the matrix multiplication unit, and
  using the destination parameter to write in the register file the result provided by the bit matrix multiplication unit.

The bit matrix multiplication unit may further be configured to respond to a variant of the bit matrix multiplication instruction by providing a double precision result corresponding to the transposed matrix of the result of the multiplication.

A bit matrix multiplication method may be provided, comprising the steps of representing bit-matrices by double precision words; reading two individually selected registers from a register file of single precision registers; joining the contents of the two read registers to form a first multiplicand matrix; multiplying the first multiplicand matrix by a second multiplicand matrix; splitting the multiplication result into two single precision words; and writing the two single precision words in two individually selected registers of the register file.

The method may comprise the further steps of defining the second multiplicand matrix directly in a first operand of a bit matrix multiplication instruction; defining the registers for forming the first multiplicand matrix in a second operand of the bit matrix multiplication instruction; and defining the registers for holding the multiplication result in a destination parameter of the bit matrix multiplication instruction.

BRIEF DESCRIPTION OF DRAWINGS

Other advantages and features will become more clearly apparent from the following description of particular embodiments of the invention provided for exemplary purposes only and represented in the appended drawings, in which:

FIG. 6 illustrates a bit interleaving operation on two packets; and

FIGS. 7A to 7D illustrate data in various phases of the execution of two particular BMM instructions used in processing the reorganization of FIG. 6.

DESCRIPTION OF EMBODIMENTS

Figure 1:
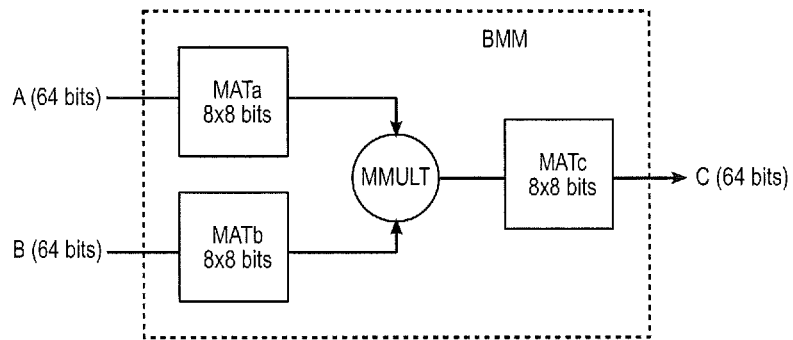
FIG. 1 is a block diagram of a BMM unit designed to handle 8×8-bit matrices.

FIG. 1 is a block diagram of a BMM unit. The size of the manipulated matrices is generally square and conforms to one of the precision formats supported by the processor.

A 32-bit processor is considered below as an example, supporting a "single" precision of 32-bits and a "double" precision of 64 bits. In this context, the matrices are 8×8-bit matrices, each of which can be represented by a double precision word (64 bits).

The BMM unit thus receives two 64-bit words A and B representing two multiplicand matrices of 8×8 bits MATa and MATb. The matrices MATa and MATb may be multiplied by a hard-wired circuit MMULT to produce a result matrix MATc of 8×8 bits. This matrix MATc is provided by the BMM unit in the form of a 64-bit word C.

In the following it is considered that the bytes forming a 64-bit word representing a matrix are sorted by increasing weight from the first row to the eighth row of the matrix, and that the bits of each byte are sorted by decreasing weights from the first column to the eighth column of the matrix. Thus, if $b_{ij}$ designates the bit of weight j of the byte of weight i of a 64-bit word, the corresponding matrix is expressed as:

$$\begin{bmatrix} b_{07} & b_{06} & b_{05} & b_{04} & b_{03} & b_{02} & b_{01} & b_{00} \\ b_{17} & b_{16} & b_{15} & b_{14} & b_{13} & b_{12} & b_{11} & b_{10} \\ b_{27} & b_{26} & b_{25} & b_{24} & b_{23} & b_{22} & b_{21} & b_{20} \\ b_{37} & b_{36} & b_{35} & b_{34} & b_{33} & b_{32} & b_{31} & b_{30} \\ b_{47} & b_{46} & b_{45} & b_{44} & b_{43} & b_{42} & b_{41} & b_{40} \\ b_{57} & b_{56} & b_{55} & b_{54} & b_{53} & b_{52} & b_{51} & b_{50} \\ b_{67} & b_{66} & b_{65} & b_{64} & b_{63} & b_{62} & b_{61} & b_{60} \\ b_{77} & b_{76} & b_{75} & b_{74} & b_{73} & b_{72} & b_{71} & b_{70} \end{bmatrix}$$

As previously indicated, one of the operands receives a constant which defines the reorganization to operate in the other, variable operand. If the BMM unit performs the multiplication A×B, by choosing a constant for the operand A, a reorganization is defined among the rows of the matrix conveyed in operand B, i.e. among the bytes of operand B. By choosing a constant for the operand B, a corresponding reorganization is defined among the columns of the matrix conveyed by the operand A. The cases considered below by way of example can be processed using constants for the operand A.

A particular constant is that associated with the identity matrix, comprising 1s only in the first diagonal. For an 8×8 matrix representing 64-bit operands B, the identity matrix is expressed in hexadecimal by:

MID=0x80 40 20 10 08 04 02 01

Each pair of digits of a constant represents a byte or row of the matrix, the least significant byte (0x01) corresponding to the first row of the matrix.

From this constant MID, a hexadecimal constant MOP may be built defining an arbitrary byte permutation operation. It is considered that the weights of the bytes of the operands and of the results increase from right to left from the value 0. Then, if the position i of the constant MOP contains the value 0xXY, where 0xXY is the content at position j of the constant MID, the operation produces a result C whose byte at position i receives the byte at position j of the second operand B.

Figure 2:
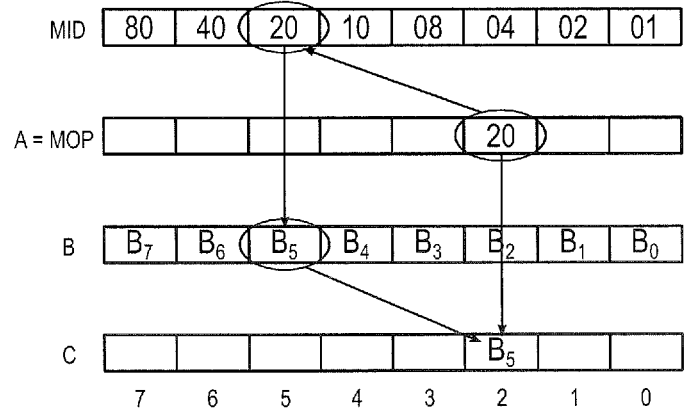
FIG. 2 illustrates the operation of a BMM unit.

FIG. 2 illustrates this functionality with an example. The first operand A receives a constant MOP whose byte of weight 2 contains the value 0x20, for instance. The operand B receives eight bytes $B_0$ to $B_7$. The byte of value 0x20 in constant MOP identifies weight 5 in the identity matrix MID. In those circumstances, the byte of weight 5, $B_5$, of operand B is placed as weight 2 in the result C.

According to this technique, several useful constants may be defined, for example:

0x01 02 04 08 10 20 40 80: reverse the byte order in the second operand B,

0x80 40 08 04 20 10 02 01: interleaving the 16-bit words of the two 32-bit words forming the operand B, 0x80 08 40 04 20 02 10 01: interleaving the bytes of the two 32-bit words forming the operand B, etc.

Any reorganization of bytes within a same operand B is thus possible by suitably building a constant MOP for operand A. However, there are situations where it is desired to reorganize data of a data sequence that does not fit in a matrix processed by the BMM unit. The data sequence may then be divided into several packets of the size of a matrix, and each packet may be processed in turn by the BMM unit. If the data of two consecutive packets should be mixed in a single multiplication result C, it may be necessary in conventional architectures to effect several transfers between registers to prepare the operands before they can be provided to the BMM unit.

Figure 3:
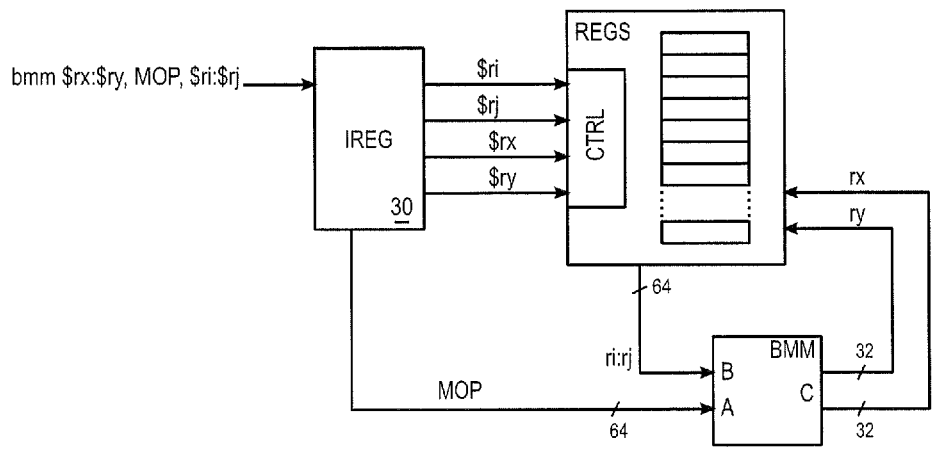
FIG. 3 is a block diagram of a BMM unit associated with a processor register file of particular structure.

FIG. 3 is a partial block diagram of an embodiment of a processor with a BMM unit achieving reduction of the number of instruction cycles necessary to mix data from several packets, by using specific BMM instructions.

The processor includes a register file REGS. The size of the registers is adapted to the processor architecture. In the context of a 32-bit processor, the registers also have a size of 32 bits, corresponding to single precision. The BMM unit is however designed to process words of double precision (64 bits). The register file is associated with a control circuit CTRL, which may be designed to provide simultaneously the contents of a register pair as a 64-bit multiplicand to the BMM unit. The control circuit may also be designed to write the result of the multiplication, of double precision, in a pair of registers.

In a conventional processor architecture designed for thus using a pair of registers to handle double precision data, the instructions only identify the first register in the pair. The second register of the pair is implicitly the next register in the addressing system of the register file. Thus, the instructions manipulating double precision data can only identify even-numbered registers, knowing that the odd-numbered registers are reserved for forming implicit pairs with the registers identified in the instructions.

The architecture of FIG. 3 is designed so that instructions can explicitly identify any two registers to form a pair for holding a double precision word. In particular, a BMM instruction is provided to explicitly identify each of the two registers that together contain an operand, and each of the two registers that together receive the result.

More specifically, to perform a matrix multiplication of the type C=MOPxB, the following BMM instruction may be provided:

bmm $rx:$ry, MOP, $ri:$rj

Where "$rx:$ry" designates the addresses of the two registers to use for receiving the result C, and "$ri:$rj" designates the addresses of the two registers that contain the multiplicand B. The notations without the sign "$" designate the contents of registers. The notation "MOP" designates an immediate double precision constant conveyed in the instruction, which is provided directly as multiplicand A to the BMM unit. It is assumed that the first register of the register pairs contains the least significant bytes and the second register the most significant bytes. The constant MOP is then expressed in the same format—for example, if the constant MOP is chosen equal to the identity matrix MID, it would be expressed in the form:

MOP=0x08040201:0x80402010.

An instruction register 30 is designed to provide in parallel the register addresses ($ri, $rj, $rx, $ry) conveyed by the bmm instruction to the control circuit CTRL, and the operand MOP as multiplicand A to the BMM unit. The control circuit is designed to join the contents of registers $ri and $rj to form the multiplicand B of the BMM unit, and to split the result C of the multiplication into the two registers $rx and $ry (the lower weight bytes being assigned to the first registers of the pairs).

In some architectures, the operand A of the bmm instruction may also be of register type and, like the operand B, identify a pair of explicit registers $ru:$rv.

In fact, in many processor architectures, immediate values conveyed in the instructions are used as the last parameter. Then it is preferred to use an instruction like:

sbmm $rx:$ry, $ri:$rj, MOP

Where sbmm C, B, A

Produces the same result as bmm C, A, B

The BMM unit is not changed—the prefix "s" (for "swapped") of the sbmm instruction simply means that the operands of the instruction are swapped in wiring relative to the multiplicands of the BMM unit.

Figures 4, 5A, 5B, 5C:
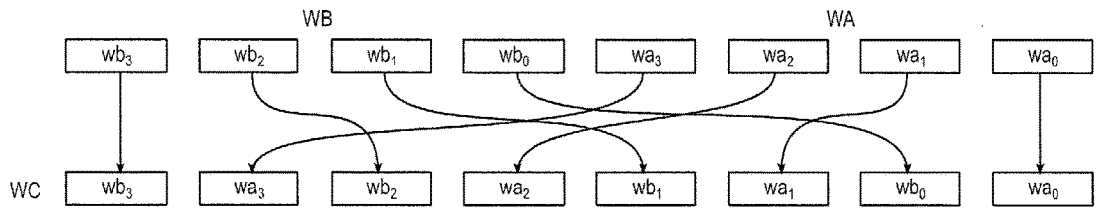
FIG. 4 illustrates an operation for interleaving words from two packets.
FIGS. 5A to 5C illustrate data in various phases of the execution of a particular BMM instruction used in processing the reorganization of FIG. 4.

FIG. 4 illustrates a first example of data reorganization consisting of interleaving 16-bit words of two packets of four 16-bit words. Such a type of reorganization may be useful for Single Instruction, Multiple Data (SIMD) processors. In a SIMD processor, a single instruction is provided simultaneously to several similar processing units that simultaneously process respective data lanes. In many situations, it is desired at certain processing stages to switch data to different lanes.

The words of the first packet WA are designated $wa_0$ to $wa_7$ and the words of the second packet WB by $wb_0$ to $wb_7$. The interleaving operation produces a sequence of eight 16-bit words WC where each word taken in packet WA is followed by the word of same weight of packet WB, as shown.

With the architecture of FIG. 3, such an operation can be performed using only two sbmm instructions. For example, assuming that the two packets are initially contained in registers $r0 to $r3:

sbmm $r10:$r11, $r0:$r2, 0x20100201:0x80400804
sbmm $r12:$r13, $r1:$r3, 0x20100201:0x80400804

FIGS. 5A-5C illustrate in more detail the operation of these instructions.

FIG. 5A shows the initial contents of registers $r0 to $r3, in the form of 8×8 bit matrices in the previously specified format. The cells of the matrices simply indicate the indices ij of the bits. The pair of registers $r0:$r1 contains the packet of words WA, and the indices are indicated in bold. The pair of registers $r2:$r3 contains the packet WB, and the indices are indicated in italics. Each word, of 16 bits, occupies two consecutive rows of the corresponding matrix. The contents of the first registers of the pairs, associated with the lower weight words, are located in the upper half of the matrices.

It shall be noted that each operand B of the sbmm instructions above designates a pair of registers that do not correspond to a same matrix of FIG. 5A. In fact, each operand B designates a matrix constructed from one half of each of the two matrices of FIG. 5A.

FIG. 5B shows the matrices used as operands B by the sbmm instructions. The ability to freely select the two registers used for forming the operand B allows, at no extra cost in instruction cycles, performing a preliminary reorganization, especially a reorganization involving the two packets WA and WB. More specifically, in FIG. 5B, the operand B of the first sbmm instruction includes the first two words of the packet WA, taken in the register $r0, and the first two words of the packet WB, taken in register $r2. The operand B of the second sbmm instruction includes the last two words of the packet WA, taken in the register $r1, and the last two words of the packet WB, taken in the register $r3.

The constant MID is shown to the right of the matrices in correspondence with the rows of the matrices.

In FIG. 5C, both sbmm instructions have been executed and the results have been written in the register pairs $r10:$r11 and $r12:$r13, respectively. The resulting reorganization left the first two rows and the last two rows of each matrix unchanged and exchanged the last two rows of the first register with the first two rows of the second register.

The value of the constant MOP is indicated to the right in correspondence with the rows of the matrices. It shall be noted that the pairs of digits of the constant MID in FIG. 5B have "followed" their respective rows in FIG. 5C to form the constant MOP.

In a conventional architecture using pairs of implicit registers to convey double precision data, none of the matrices of FIG. 5B is usable directly as an operand B of a BMM instruction. Indeed, the registers of the pairs do not have consecutive addresses. It would first be necessary to exchange the contents of registers $r1 and $r2 of FIG. 5A, which implies the execution of three register to register write instructions using a temporary register. In other words, the same operation would require five instructions for processing the two packets instead of two.

To extend the capabilities of the processor, an instruction designated by sbmmt may be added for performing both a BMM operation and a transposition of the result matrix C. In other words, the execution of the instruction:

sbmmt C, B, MOP

Provides a result C that is the transposed of the matrix C produced by the instruction sbmm C, B, MOP Such an instruction sbmmt may use the same BMM unit as the sbmm instruction. The transposition may be achieved simply through the wiring of the output of the BMM unit. The instruction may be used to perform a simple transposition when the operand MOP is equal to the identity matrix MID.

FIG. 6 illustrates a reorganization example where the sbmmt instruction is useful. This is a so-called "bit-slicing" operation performed by way of example on a sequence of 16 bytes $b_0$ to $b_{15}$ to produce eight 16-bit words $w_0$ to $w_7$. The operation involves grouping in a word $w_i$ the bits of weight i of the 16 bytes, the bytes being used per increasing weight. Such an operation may be performed using only two sbmmt instructions and two sbmm instructions. For example, assuming that the 16 bytes are initially contained in the registers $r0 to $r3 by increasing weights:

sbmmt $r0:$r1, $r0:$r1, 0x08040201:0x80402010
sbmmt $r2:$r3, $r2:$r3, 0x08040201:0x80402010
sbmm $r10:$r11, $r0:$r2, 0x20021001:0x80084004
sbmm $r12:$r13, $r1:$r3, 0x20021001:0x80084004

FIGS. 7A-7D illustrate in more detail the operation of these instructions in the same format as FIGS. 5A to 5C. The constant MOP of the first two sbmmt instructions is the identity matrix MID. The result is that these instructions perform a simple transposition.

FIG. 7A shows the initial contents of the registers $r0 to $r3, the pair of registers $r0:$r1 containing bytes b0-b7 of the sequence, and the pair of registers $r2:$r3 containing bytes b8-b15.

FIG. 7B illustrates the results of the sbmmt instructions, results that are overwritten in registers $r0 to $r3. The matrices of FIG. 7A have been transposed.

The sbmmt instructions thus classify the bits of same weight of each byte in the same row, and the bits of a same byte in the same column. The weights of the bytes increase from right to left, and the weights of the bits increase from top to bottom.

FIG. 7C shows the matrices used as operands B by the sbmm instructions. More specifically, the operand B of the first sbmm instruction is formed by the contents of the register pair $r0:$r2, and the operand B of the second sbmm instruction is formed by the contents of the register pair $r1:$r3.

The identity constant MID is illustrated to the right of the matrices in correspondence with the rows of the matrices.

In FIG. 7D, the two sbmm instructions have been executed and the results have been written in the register pairs $r10:$r11 and $r12:$r13, respectively.

The value of the constant MOP is indicated to the right in correspondence with the rows of the matrices. It shall be noted that the digit pairs of the constant MID of FIG. 7C have "followed" their respective rows in FIG. 7D to form the constant MOP. This constant is among those indicated above, operating the byte interleaving of the two 32-bit words of the operand B.

In a conventional architecture using pairs of implicit registers to convey double precision data, none of the matrices of FIG. 7C is usable directly for operand B of a BMM instruction. Indeed, the registers of the pairs do not have consecutive addresses. It would first be required to exchange the contents of registers $r1 and $r2 of FIG. 7B, which implies the execution of three register to register write instructions using a temporary register. In other words, the same operation would require seven instructions for processing the two packets instead of four.

In certain processor architectures dedicated to cryptography, a specific processing unit may be provided for "bit-slicing", which has a surface area that may be greater than that of a BMM unit. The processor architecture described herein provides, with a single BMM unit, and a set of instructions that can explicitly identify the registers to be used for double precision data, generic and flexible data reorganizing functions that are not restricted to specific technical areas.

What is claimed is:

1. A processor comprising:
a register file of single precision registers configured to:
(i) upon reading, join the contents of two individually designated registers in an output word of double precision, and (ii) upon writing, split an input double precision word into two individually designated registers;
in an instruction set of the processor, a bit matrix multiplication instruction having:
a first double precision operand representing a first matrix to multiply,
a second operand explicitly designating any two single precision registers whose joint contents represent a second matrix to multiply, and
a destination parameter explicitly designating any two single precision registers for jointly containing a matrix representing the result of the multiplication;
a bit matrix multiplication unit configured to receive two multiplicand matrices in the form of double precision words and write a result matrix in the form of a double precision word in the register file; and
an instruction processing unit configured, upon execution of a bit matrix multiplication instruction, to:
provide the first operand directly as a first of the two multiplicands of the bit matrix multiplication unit,
apply the second operand to read in the register file the second multiplicand of the matrix multiplication unit, and
apply the destination parameter to write in the register file the result provided by the bit matrix multiplication unit.

2. The processor according to claim 1, wherein the bit matrix multiplication unit is further configured to respond to a variant of the bit matrix multiplication instruction by providing a double precision result corresponding to the transposed matrix of the result of the multiplication.

3. A bit matrix multiplication method carried out by an instruction processing unit of a processor in response to a single bit matrix multiplication instruction, the bit matrix multiplication instruction including:
a first double precision operand representing a first multiplicand matrix,
a second operand explicitly designating any two single precision registers of a register file, whose joint contents represent a second multiplicand matrix, and
a destination parameter explicitly designating any two single precision registers of the register file for jointly containing a matrix representing the result of the bit matrix multiplication,
the method comprising the following steps:
providing the first operand directly to a first multiplicand input of a bit matrix multiplication unit;
applying the second operand to read two corresponding registers in the register file;
providing the joint contents of the two registers to a second multiplicand input of the bit matrix multiplication unit;
multiplying the first and second multiplicands in the bit matrix multiplication unit; and
applying the destination parameter to write in two corresponding registers of the register file a result provided by the bit matrix multiplication unit.

4. The method of claim 3, further comprising the following steps for performing data interleaving:
writing first and second bit matrices containing data to interleave, each in two contiguous registers of the register file;
executing a first bit matrix multiplication instruction having its second operand identifying a first of the two contiguous registers containing the first bit matrix, and a first of the two contiguous registers containing the second bit matrix; and
executing a second bit matrix multiplication instruction having its second operand identifying the second of the two contiguous registers containing the first bit matrix, and the second of the two contiguous registers containing the second bit matrix.

5. The method of claim 4, wherein the destination parameter of each of the first and second bit matrix multiplication instructions identifies two contiguous registers of the register file, and the first operand of each of the first and second bit matrix multiplication instructions is an identity bit matrix.

6. The method of claim 3, further comprising the following steps for performing bit slicing:
transposing each of a first and a second bit matrix containing data on which to perform bit slicing;
writing the transposed first and second bit matrices, each in two contiguous registers of the register file;
executing a first bit matrix multiplication instruction having its second operand identifying a first of the two contiguous registers containing the transposed first bit matrix, and a first of the two contiguous registers containing the transposed second bit matrix; and
executing a second bit matrix multiplication instruction having its second operand identifying the second of the two contiguous registers containing the transposed first bit matrix, and the second of the two contiguous registers containing the transposed second bit matrix.

7. The method of claim 6, wherein the destination parameter of each of the first and second bit matrix multiplication instructions identifies two contiguous registers of the register file, and the first operand of each of the first and second bit matrix multiplication instructions is a constant for byte-interleaving.

* * * * *